US009088940B2

(12) United States Patent
Marco et al.

(10) Patent No.: US 9,088,940 B2
(45) Date of Patent: Jul. 21, 2015

(54) METHOD FOR FACILITATING SYNCHRONISATION BETWEEN A COMMUNICATIONS NETWORK AND A WIRELESS COMMUNICATIONS DEVICE OPERATING IN A CPC DTX MODE AND A WIRELESS COMMUNICATIONS DEVICE

(75) Inventors: Olivier Marco, Toulouse (FR); Matthieu Baglin, Toulouse (FR)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 13/540,676

(22) Filed: Jul. 3, 2012

(65) Prior Publication Data

US 2013/0021992 A1 Jan. 24, 2013

(30) Foreign Application Priority Data

Jul. 18, 2011 (EP) ..................................... 11290325

(51) Int. Cl.
*H04W 4/00* (2009.01)
*H04W 56/00* (2009.01)

(52) U.S. Cl.
CPC ..................................... *H04W 56/00* (2013.01)

(58) Field of Classification Search
CPC ...... H04W 72/04; H04W 88/08; H04W 76/00
USPC .................................. 370/329, 322, 328, 338
See application file for complete search history.

(56) References Cited

U.S. PATENT DOCUMENTS 5,815,798 A 9/1998 Bhagalia et al.
6,456,826 B1 * 9/2002 Toskala et al. ............... 455/63.1
(Continued)

FOREIGN PATENT DOCUMENTS

WO 2010071548 A1 6/2010
WO 2010078208 A1 7/2010

OTHER PUBLICATIONS

Office Action for European Application No. 11290325.7, issued Oct. 1, 2013.
(Continued)

*Primary Examiner* — Hassan Phillips
*Assistant Examiner* — Siren Wei
(74) *Attorney, Agent, or Firm* — Schwabe, Williamson & Wyatt, P.C.

(57) ABSTRACT

A method for facilitating synchronization between a communications network (102) and a wireless communications device (104, 106, 200) operating in a Continuous Packet Connectivity, CPC, discontinuous transmission, DTX, mode, comprises monitoring (304) at the wireless communications device (104, 106, 200) the radio conditions of downlink communications using control bits received from the communications network (102) to determine when the wireless communications device (104, 106, 200) is at a nearly out of synchronization state with the communications network (102). In response to determining the wireless communications device (104, 106, 200) is at a nearly out of synchronization state, the wireless communications device (104, 106, 200) sends (310) to the communications network (102), additional control information on a control channel. The wireless communications device (104, 106, 200) receives (312) additional control bits sent by the communications network (102) in response to the communications network (102) receiving the additional control information sent by the wireless communications device (104, 106, 200).

14 Claims, 5 Drawing Sheets

(56) References Cited

U.S. PATENT DOCUMENTS

| | | | |
|---|---|---|---|
| 7,254,413 | B2 | 8/2007 | Muller et al. |
| 7,924,748 | B2 | 4/2011 | Yomo et al. |
| 8,538,472 | B2 | 9/2013 | Dawid et al. |
| 2001/0046220 | A1* | 11/2001 | Koo et al. ............ 370/335 |
| 2005/0075122 | A1* | 4/2005 | Lindoff et al. ........ 455/522 |
| 2006/0246937 | A1* | 11/2006 | Lindoff .............. 455/522 |
| 2009/0086682 | A1* | 4/2009 | Kazmi et al. ......... 370/335 |
| 2010/0074188 | A1 | 3/2010 | Hsu |

OTHER PUBLICATIONS

Office Action received in European Patent Application No. 11 290 325.7, issued Feb. 25, 2014.

European Patent Office; European Search Report for European App. No. 11290325.7, mailed Nov. 16, 2011; 6 pages.

* cited by examiner

METHOD FOR FACILITATING SYNCHRONISATION BETWEEN A COMMUNICATIONS NETWORK AND A WIRELESS COMMUNICATIONS DEVICE OPERATING IN A CPC DTX MODE AND A WIRELESS COMMUNICATIONS DEVICE

FIELD OF THE DISCLOSURE

This disclosure relates to a method for facilitating synchronisation between a communications network and a wireless communications device operating in a Continuous Packet Connectivity, CPC, discontinuous transmission, DTX, mode, and a wireless communications device.

BACKGROUND OF THE DISCLOSURE

3rd generation (3G) systems, such as the Universal Mobile Telecommunication System (UMTS) have been developed and deployed to further enhance the communication services provided to mobile users compared to those communication services provided by the 2nd generation (2G) communication system known as the Global System for Mobile communication (GSM).

High Speed Downlink Packet Access (HSDPA) and High Speed Uplink Packet Access (HSUPA) have been developed to optimise UMTS with increased data rate and capacity for packet data services in downlink and uplink, respectively. HSDPA and HSUPA are referred together as High Speed Packet Access (HSPA). Standards for HSPA have been established within the Third Generation Partnership Project (3GPP): HSDPA was introduced as a release 5 feature in 3GPP and HSUPA was introduced in release 6. Within 3GPP release 7, further improvements to HSPA have been specified in the context of HSPA+ or HSPA evolution.

As is well known, cellular communication systems, such as UMTS, provide communication to mobile devices via a plurality of cells, with each cell served by one or more base stations. The base stations are interconnected by a radio network controller which can communicate data between the base stations. A mobile device communicates via a radio communication link with a base station of the cell within which the mobile station is situated. In UMTS, the base stations which are part of the UTRAN are known as Node Bs and a mobile device is known as User Equipment (UE).

3GPP release 7 introduced Continuous Packet Connectivity (CPC) which is aimed at providing improved user experience. For example, CPC allows a UE to stay connected over longer periods and so avoids frequent connection termination and re-establishment, even though the UE may only occasionally have active periods of data transmission. CPC includes features to reduce the uplink and downlink control channel overhead so as to reduce uplink noise, reduce power consumption in the UE (and so preserve UE battery) and increase downlink capacity. These features include an Uplink Discontinuous Transmission (DTX) mode for reducing uplink control channel overhead and a Downlink Discontinuous Reception (DRX) mode for reducing downlink control channel overhead. During the DTX and DRX modes (i.e. during temporary HSPA data transfer inactivity periods), the UE is in an active state known as a DCH state. The 3GPP Technical Specification TS 25.308 V7.12.0 gives an overview of CPC (see section 11) and 3GPP Technical Specification TS 25.214 V7.17.0 provides details of the physical layer impacts of CPC (section 6C).

The communications network configures the UE with DTX/DRX parameters which allow the UE to enter the DTX and DRX modes and which define the patterns or cycles of the DTX and DRX modes.

If the UE has no data to transmit, the UE enters a DTX mode during which the UE automatically stops the continuous transmission of control information on the Uplink Dedicated Physical Control Channel (UL-DPCCH) and applies a known DTX pattern for transmission of control information on UL-DPCCH. Typically, the DTX mode includes two DTX patterns or cycles configured by the communications network: one short pattern or cycle (DTX1) and one long pattern or cycle (DTX2). The pattern defines the length of the transmission cycle, the number of slot and slot position in the transmission cycle that the UE shall transmit uplink DPCCH (UL-DPCCH). The choice of the pattern depends on data activity and is determined by the UE. The UE will initially switch to the short pattern when there is no data to be transmitted and then after a certain period of time and when there is still no data to be sent, the UE will switch to the long pattern. In one example, for the long pattern DTX2, the UE transmits control messages on UL-DPCCH for 2 ms every 320 ms. The UL-DPCCH when received is used by the network to evaluate UE transmit power and generate downlink Transmit Power Control commands (DL-TPC) in order to control the transmission power of the UE. The control information on UL-DPCCH also include uplink Transmit Power Control (UL-TPC) commands or bits which are used by the communications network to control its downlink transmission power towards the UE.

When in the DTX mode, the UE does not send uplink Transmit Power Control (UL-TPC) commands in all uplink slots. This means that it takes longer for the communications network to react which results in the downlink power control being slower. Thus, when a UE operates in a CPC DTX mode, there is a higher risk of de-synchronisation in the downlink.

The downlink TPC (DL-TPC) commands are only transmitted by the communications network when it has received an UL-DPCCH from the UE. This means that it takes longer for the communications network to react which results in the uplink power control also being slower. Thus, when a UE operates in a CPC DTX mode, there is a higher risk of de-synchronisation in the uplink and added unwanted uplink interference (as the power is not correctly adjusted).

With the higher risk of de-synchronisation in the downlink and uplink, there is a higher risk that the connection will be lost. Indeed, the UE is monitoring the DPCH quality in order to detect a loss of the signal at a physical level (as specified in TS 25.224). Thresholds Qout and Qin specify respectively at what DPCH quality levels the UE shall shut its power off and when it shall turn its power on. In CPC mode, with the higher risk of de-synchronisation, the UE can more easily enter a state where it has shut down its transmitter because the threshold Qout has been reached.

US patent application no. 2009/0086682 describes a mechanism for downlink out-of-sync detection in CPC which requires the serving Node B to send valid TPC bits even while the UE is in DTX mode. By continuously transmitting TPC bits to all UEs in a cell, such a mechanism increases the amount of interference.

BRIEF DESCRIPTION OF THE DRAWINGS

A method for facilitating synchronisation between a communications network and a wireless communications device operating in a CPC DTX mode, and a wireless communications device in accordance with the disclosure will now be described, by way of example only, with reference to the accompanying drawings in which.

DETAILED DESCRIPTION OF THE DRAWINGS

Figure 1:
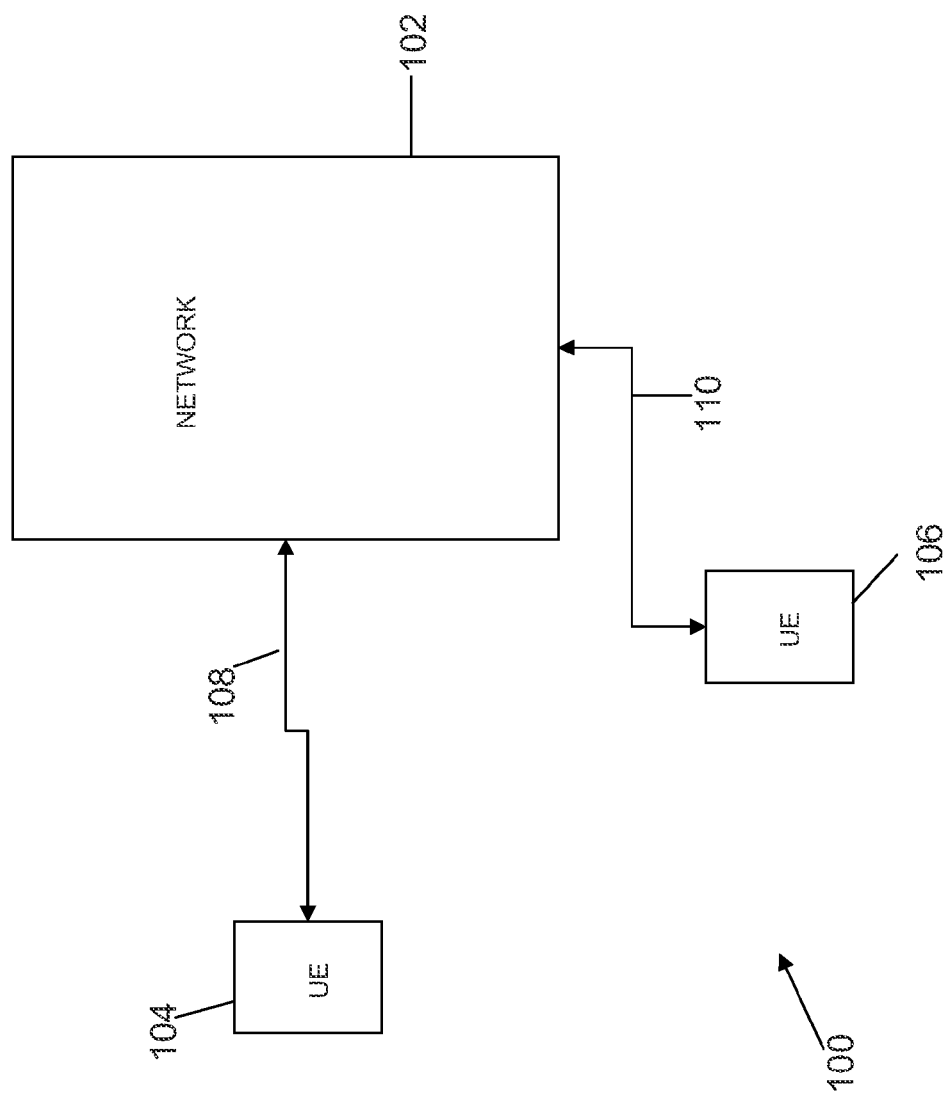
FIG. 1 is a block schematic diagram of a communication system in accordance with an example embodiment of the present disclosure.

Referring now to FIG. 1, a communication system 100 in accordance with an example of an embodiment of the disclosure comprises a communications network 102 and a plurality of wireless communications devices 104, 106, only two of which are shown.

In an example of a UMTS communication system, the communications network 102 comprises a plurality of base stations or Node Bs (not shown) communicatively coupled to a core network (not shown) via at least one Radio Access Network (RAN) (not shown) as is well known in the art. It will be appreciated that the present disclosure is not limited to UMTS communication systems and may be used with other wireless communication systems, such as LTE systems, 4G systems or the like.

The wireless communications devices 104, 106 communicate with the network 102 via radio communication links 108, 110 between the wireless communications devices and base stations (not shown).

Figure 2:
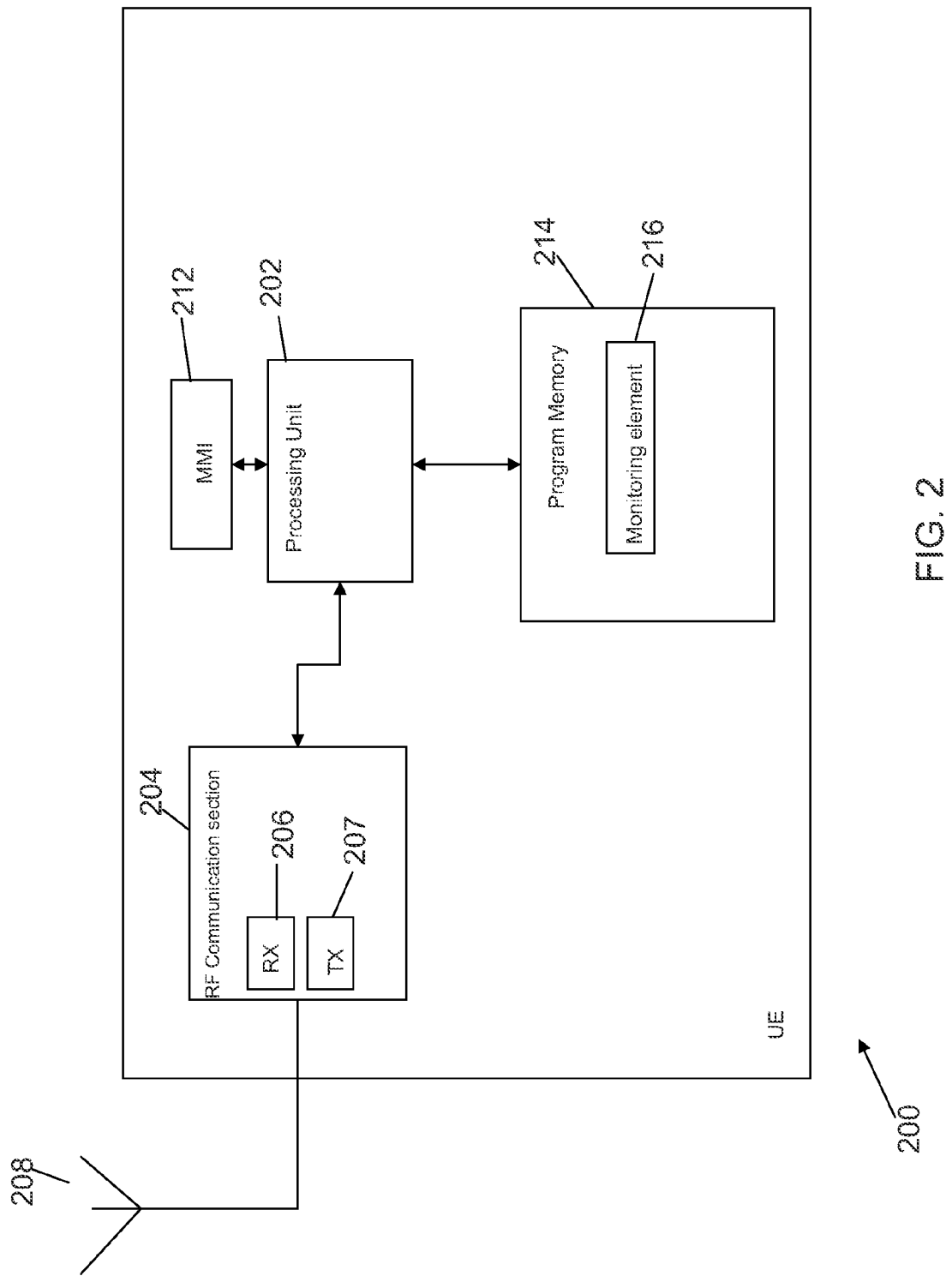
FIG. 2 is a block schematic diagram of a wireless communications device in accordance with an example embodiment of the present disclosure.

FIG. 2 is a block schematic diagram of a wireless communications device 200, such as the device 104 or 106 shown in FIG. 1, in accordance with an embodiment of the disclosure. The wireless communications device may be a portable or handheld or mobile telephone, a Personal Digital Assistant (PDA), a portable computer, portable television and/or similar mobile device or other similar wireless communications device. In the following description, the wireless communications device will be referred to generally as a UE for illustrative purposes and it is not intended to limit the disclosure to any particular type of wireless communications device.

As will be apparent to a skilled person, FIG. 2 shows only the main functional components of an exemplary UE 200 that are necessary for an understanding of the invention.

The UE 200 comprises a processing unit 202 for carrying out operational processing for the UE 200. The UE 200 also has a RF communication section 204 for providing wireless communication via a radio communication link with the communications network 102 of FIG. 1. The RF communication section 204 typically includes an antenna 208, a receiver section 206, and a transmitter section 207. Although not shown in FIG. 2 but as is well known, the receiver section 206 typically includes elements such as a receiver, demodulator, decoder and the transmitter section 207 typically includes elements such as a transmitter, modulator, coder. The RF communication section 204 is coupled to the processing unit 202.

The UE 200 also has a Man Machine Interface MMI 212, including elements such as a key pad, microphone, speaker, display screen, for providing an interface between the UE and the user of the UE. The MMI 212 is also coupled to the processing unit 202.

The processing unit 202 may be a single processor or may comprise two or more processors carrying out all processing required for the operation of the UE 200. The number of processors and the allocation of processing functions to the processing unit is a matter of design choice for a skilled person. The UE 200 also has a program memory 214 in which is stored programs containing processor instructions for operation of the UE 200. The programs may contain a number of different program elements or sub-routines containing processor instructions for a variety of different tasks, for example, for: communicating with the user via the MMI 212; processing data received at the receiving section 206, such as signalling information or signalling messages received from the communications network 102 (e.g. paging signals, TPC commands, coding and timing information) and traffic data (e.g. voice data); and processing data (such as voice data input at the MMI 212) for transmission by the transmitting section 207. Specific program elements stored in program memory 214 include a monitoring element 216 for monitoring the radio conditions of downlink communications using control bits received from the communications network 102 to determine when the UE 200 is at a nearly out of synchronisation state with the communications network 102. The operation of the monitoring element 216 will be described in more detail below.

The UE 200 may communicate with the network 102 via radio communication links or radio channels or radio bearers provided by a HSPA radio interface. These links provided by the HSPA radio interface include a High Speed-Downlink Shared Channel (HS-DSCH) and a high speed-shared control channel (HS-SCCH) which is a downlink (DL) physical channel used to carry downlink control information related to the HS-DSCH transmissions. Uplink channels are also provided including Enhanced Dedicated Channel (E-DCH) for data transmissions, High Speed-Dedicated Physical Control Channel (HS-DPCCH) over which control information, such as channel quality indicators (CQIs), and hybrid automatic repeat request (HARQ) acknowledgements (ACKs) and negative acknowledgements (NACKS) are communicated to the serving base station and the uplink Dedicated Physical Control Channel (UL-DPCCH) over which control information, such as UL-TPC bits or pilot bits, are transmitted during allocated time periods of a discontinuous transmission (DTX) cycle of the CPC mode. For a 3GPP release 7 or later UE, the UE 200 may provide data services over the HSPA radio interface with CPC, in which case the UE 200 may enter DRX or DTX modes in order to reduce the uplink and downlink control channel overhead whilst providing data services.

Control information on UL-DPCCH is transmitted by the UE 200 whenever the UE 200 transmits data on E-DCH or HS-DPCCH. When the UE 200 is not transmitting data (on E-DCH or HS-DPCCH) and enters a DTX mode, the UE stops the continuous transmission of control information on DPCCH and transmits control information in short bursts of subframes according to a DTX pattern which is configured by the communications network 102. As discussed above, the communications network 102 provides configuration information for DRX/DTX parameters to the UE 200 such as the DTX cycle parameter and the Inactivity Threshold for DTX parameter. The DTX cycle parameter defines the cycle or pattern of the DTX mode and indicates when over the DPCCH subframes the UE 200 should transmit the control information as short bursts. In other words, the DTX cycle parameter defines the length of the transmission cycle or a period between when the UE transmits control information on DPCCH. For two DTX patterns, two DTX cycle parameters are defined. The short DTX pattern DTX cycle 1 will have a DTX cycle parameter UE_DTX_cycle_1 and the long DTX pattern DTX cycle 2 will have a DTX cycle parameter UE_DTX_cycle_2. UE_DTX_cycle_2 will be greater than UE_DTX_cycle_1. The parameter 'Inactivity Threshold for DTX' indicates the number of subframes of the E-DCH, or a period, after the last E-DCH transmission and without a further E-DCH transmission after which the UE switches immediately from UE DTX cycle 1 to UE DTX cycle 2 when running the UL DTX. The parameters UE_DPCCH_burst_1 and UE-DPCCH_burst_2 determine the UL-DPCCH burst length in subframes when UE_DTX_cycle_1 and UE_DTX_cycle_2 are applied respectively.

As an example, for the UE_DTX_cycle_2 long DTX pattern, the control information or control bits may be transmitted as bursts, with each burst being in three time slots of a 2 ms DPCCH sub-frame and the UE_DTX_cycle_2 parameter is 320 ms.

The control information sent by the UE 200 on DPCCH may include uplink Transmit Power Control (UL-TPC) commands or bits which are used by the communications network 102 to control its downlink transmission power towards the UE. The communications network 102 also generates and sends TPC commands or bits to the UE 200, via the Fractional Dedicated Physical Channel (F-DPCH), in response to receiving control information from the UE 200 on UL-DPCCH, in order to adjust the UE transmission power. The TPC bits are received at the UE 200 in the F-DPCH slot following the DPCCH burst from the UE 200. If no DPCCH is received, the communications network 102 does not send TPC bits to the UE 200. As discussed in the introduction, with the UE 200 operating in a CPC DTX mode, the UE 200 sends less control information to the communications network 102 and the result is a higher risk of desynchronisation in downlink and/or uplink and a higher risk of a loss of connection or added unwanted uplink interference.

It is known to monitor for the loss of synchronisation in the downlink by monitoring the quality of downlink signals and when the quality is determined to be below or under a threshold, the UE is requested to stop completely all uplink transmissions and shut its transmitter off. This known monitoring mechanism is known as Qin/Qout mechanism and is described in 3GPP Technical Specification TS 25.214 V7.17.0 (sections 4.3.1 and 5.1.2.2).

Briefly, whilst in the CPC DTX mode, the UE 200 in a first phase initiates a downlink synchronisation procedure and estimates the quality of the TPC bits of the Fractional Dedicated Physical Channel (F-DPCH) frame received from the serving base station or Node B over the previous 40 ms period to be better than a threshold Qin. The threshold Qin is defined implicitly by the relevant tests in 3GPP TS 25.101: "UE Radio transmission and Reception (FDD)".

The second phase starts 160 ms after the downlink dedicated channel is considered established by higher layers. An out-of-synchronisation state (i.e. Qout condition) is reported if during a CPC DTX mode, the UE estimates the quality of the TPC bits of the F-DPCH from the serving Node B over the previous 240 slots in which the TPC bits are known to be present to be worse than a threshold Qout. The threshold Qout is defined implicitly by the relevant tests in 3GPP TS 25.101: "UE Radio transmission and Reception (FDD)".

The UE can turn its transmitter on again when the UE estimates the quality of the TPC bits of the F-DPCH from the serving Node B over the last 240 slots in which the TPC bits are known to be present to be better than a threshold Qin. When transmission is resumed, the power of the DPCCH shall be the same as when the UE transmitter was shut off.

When the quality of the TPC bits reaches the threshold Qout, it is likely that the UE will lose its connection with the serving Node B.

Figure 3:
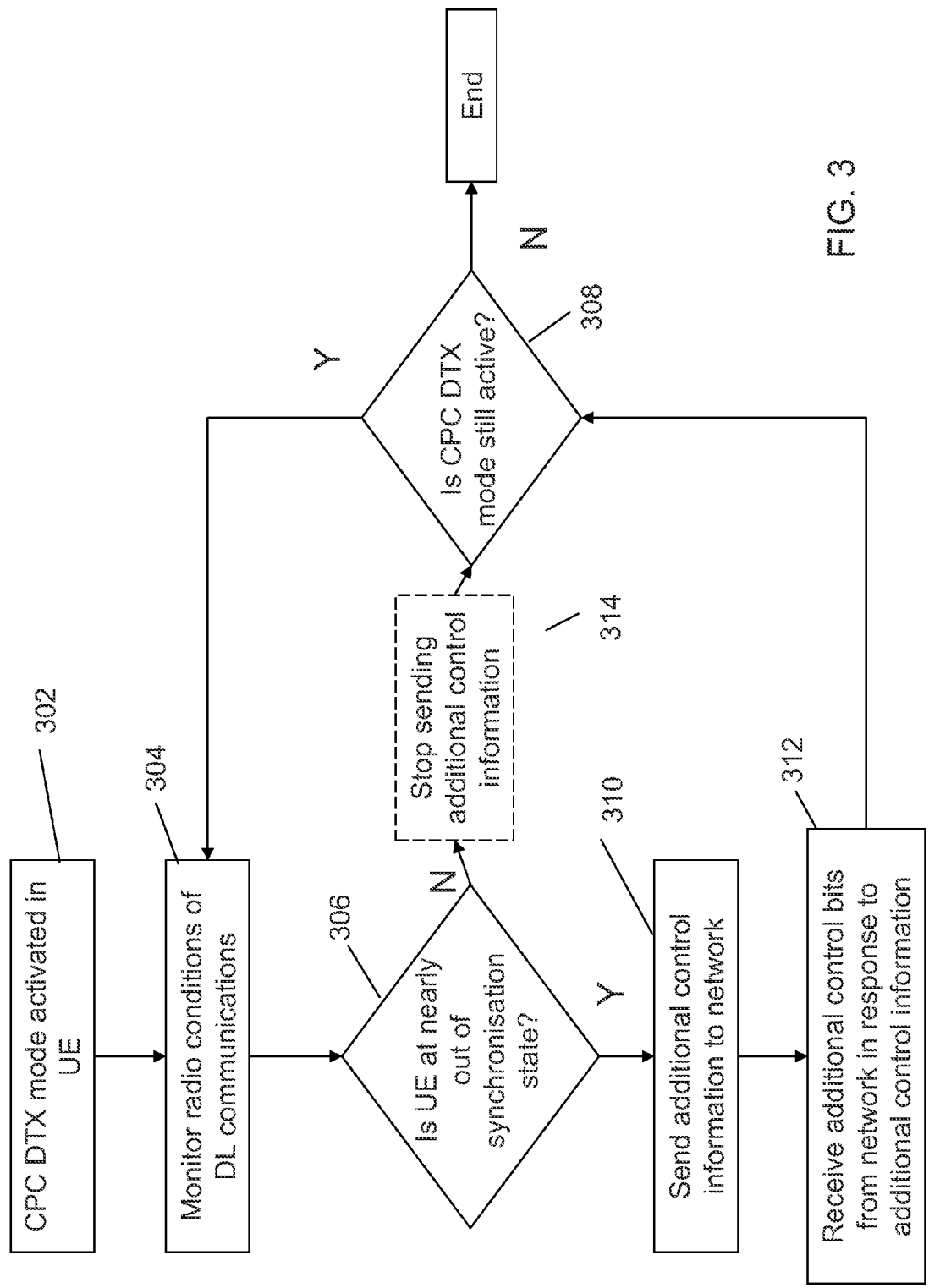
FIG. 3 is a flow diagram showing an example method for facilitating synchronisation between a communications network and a wireless communications device operating in a CPC DTX mode in accordance with an embodiment of the disclosure.

The present disclosure facilitates synchronisation between a communications network, such as communications network 102, and a UE, such as UE 200, operating in a CPC DTX mode. An example method for facilitating synchronisation in accordance with an embodiment of the disclosure will now be described with further reference to FIGS. 3 and 4.

Once the UE 200 is in a CPC DTX mode, step 300, the UE 200 monitors, by means of the monitoring element 216, the radio conditions of downlink communications using control bits received from the communications network 102 to determine when the UE 200 is at a nearly out of synchronisation state with the communications network 102, step 304. The control bits may be, for example, the Transmit Power Control, TPC, bits received from the communications network 102 in response to control information sent by the UE 200 according to a DTX pattern, such as the UE_DTX_cycle_1 short DTX pattern or the UE_DTX_cycle_2 long DTX pattern. Based on the monitoring performed by the monitoring element 216, the UE 200 (for example, under control of the processing unit 202) then determines whether the UE 200 is at the nearly out of synchronisation state or not, step 306. If the UE 200 is determined to be not at the nearly out of synchronisation state, then the flow returns to step 304, provided the UE 200 is still in the CPC DTX mode, step 308.

In response to determining the UE 200 is at a nearly out of synchronisation state, the UE 200 (for example, under control of the processing unit 202) is then arranged to send to the communications network 102, additional control information on a control channel, step 310.

At step 312, the UE 200 receives additional control bits sent by the communications network 102 in response to the communications network 102 receiving the additional control information sent by the UE. The UE 200 monitors these additional control bits with the control bits received according to a DTX pattern to determine whether the UE 200 is at a nearly out of synchronisation state.

In an example arrangement, the control channel is an Uplink Dedicated Physical Control Channel, UL-DPCCH and the additional control information is sent on UL-DPCCH. The additional control information on UL-DPCCH may only be sent by the UE 200. Alternatively or additionally, the additional control information may be, for example, control information on the UL-DPCCH associated with an empty frame or frames, such as a Logical Link Control (LLC) frame(s), with no data or a similar dummy message transmitted on E-DCH. The aim of the additional control information is to trigger the communications network (e.g. the Node B) to send additional control bits. In the case when control information on DPCCH can only be sent with an E-DCH transmission, then the frames transmitted on E-DCH need to be arranged such that the upper layers of the Node B and the communications network 102 ignore and discard the frames sent on E-DCH. This will be the case for empty LLC frames. If the specification allows for UL-DPCCH to be sent without E-DCH transmission, empty LLC frames sent on E-DCH would not be needed.

In an example arrangement, in response to receiving additional control information, the additional control bits sent by the communications network 102 may be additional TPC bits sent via F-DPCH in response to the additional control information. Thus, by sending an empty LLC frame(s) on E-DCH with a control message on DPCCH when it is determined that the UE 200 is at a nearly out of synchronisation state, in an example arrangement, the communications network 102 responds by sending TPC bits in the following F-DPCH slot. An advantage of using LLC empty frames is that the uplink DPCCH transmissions will then be aligned on MAC DTX cycle (MAC DTX Cycle maximum period length is 40 ms) as per the 3GPP specification for CPC.

Provided the UE is still in the CPC DTX mode, step 308, the flow returns to step 304 to monitor the radio conditions of downlink communications using the control bits received from the communications network 102, including the additional control bits received from the communications network 102. When the monitoring element 216 determines, at step 306, that the UE 200 is no longer at a nearly out of synchronisation state, then the UE stops sending additional control information (at step 314) and no additional control information is sent and provided the UE 200 is still in the DTX mode (step 308), the UE continues to monitor the radio conditions of downlink communications. The UE 200 will exit the DTX mode when it has data to be sent.

Figure 4:
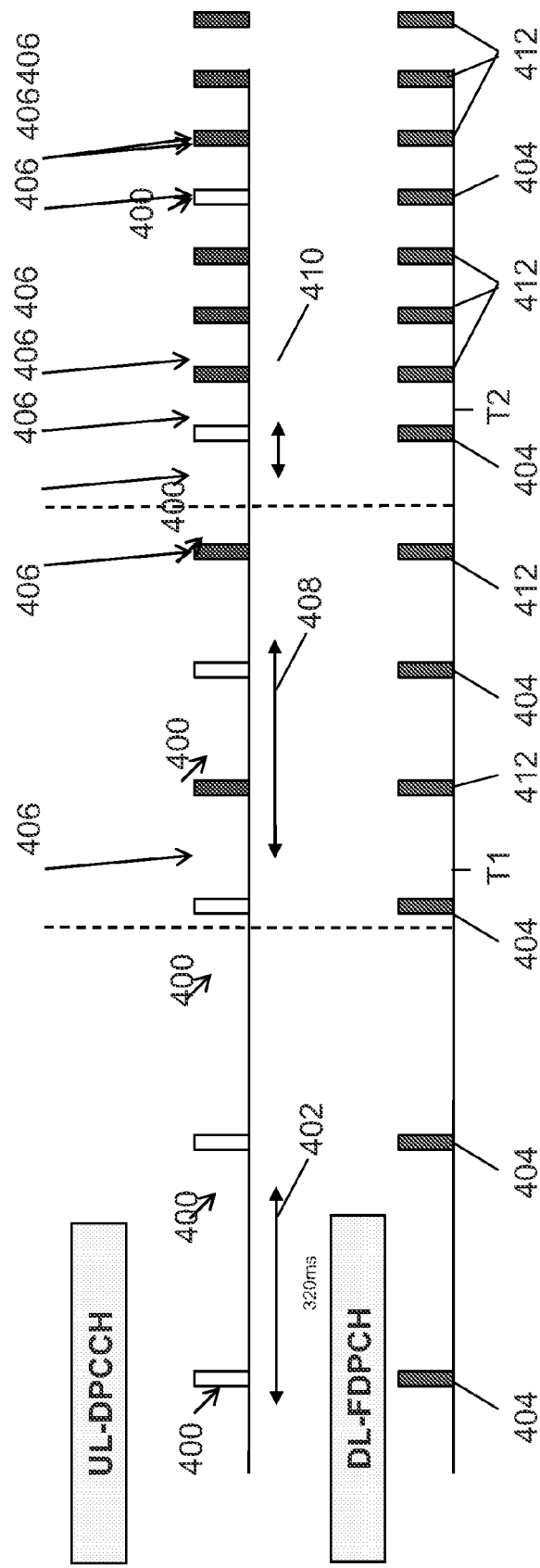
FIG. 4 is a timing diagram showing example transmissions on an uplink communication channel and downlink communication channel in accordance with the method of FIG. 3.

Referring now also to FIG. 4 which is a timing diagram showing the transmissions on an uplink control channel (shown as UL-DPCCH by way of example) and a downlink control channel (shown as DL-F-DPCH by way of example) for a UE 200 operating in CPC DTX mode in accordance with an example of an embodiment of the disclosure. The UE 200 is operating in the DTX mode according to the UE_DTX_cycle_2 long DTX pattern, with control information 400 or control bits being transmitted as bursts, with each burst being in three time slots of a 2 ms DPCCH sub-frame and the UE_DTX_cycle_2 parameter, 402, is 320 ms. At time T1, the UE 200 determines using the monitoring element 216 that the UE 200 is at the nearly out of synchronisation state and triggers the UE 200 to send additional control information 406. The additional control information 406 is sent 'in addition' to the control information 400 sent according to the DTX pattern with at least one additional control information (e.g. at least one additional control information burst) being sent between the control information 400 sent by the UE 200 according to the DTX pattern. The additional control information 406 is sent by the UE 200 until the UE determines that it is not at a nearly out of synchronisation state. The additional control information 406 may be sent periodically, for example, at a fixed rate defined by a parameter or at a rate that may vary with time. For example, at time T2, the UE 200 determines using the monitoring element 216 that the UE 200 is still at a nearly out of synchronisation state. Between T1 and T2, the UE 200 sends additional control information 406 at a first rate with a period 408. When the UE determines at T2 that the UE 200 is still at a nearly out of synchronisation state, the UE 200 changes the rate and after T2 sends additional control information 406 at a second rate with a period 410, with the second rate being greater than the first rate. Thus, the rate of transmission of the additional control information can be varied, for example, based on the determined quality of the radio conditions of downlink communications.

As can be seen in FIG. 4, in response to receiving control information 400 on DPCCH and the additional control information 406, the communications network 102 (e.g. the serving Node B), sends control bits (shown as TCP bits by way of example) to the UE 200 in bursts 404 for the control information 400 according to the DTX pattern and bursts 412 for the additional control information 406. The communications network 102 responds immediately to the DPCCH control information 400 and additional control information 406 from the UE 200 and there is only a small delay (e.g. 1 ms) between the UE 200 sending control information and receiving the control TPC bits. The additional control information 406 sent by the UE 200 and the additional TPC control bits 412 sent in response to the additional control information 406 improve the uplink and downlink synchronisation, improve the power control and reduce unwanted uplink interference.

The most efficient and effective periodicity of transmission of the additional control information 406 which provides an increase in the amount of control information sent to the communications network 102 and in response the number of additional control bits sent by the communications network 102 can be determined empirically taking account of the trade-off between improving synchronisation but keeping UL and DL transmissions to a minimum during the DTX mode.

In an example arrangement, monitoring the radio conditions comprises determining an average quality of the control bits received from the communications network 102 over a first period of time (e.g. average quality of the control bits received from the communications network 102 in a first number of time slots) and when the determined average quality is below a first minimum threshold, determining that the UE 200 is at the nearly out of synchronisation state. For example, the average quality of the control bits is determined by calculating the average of the signal-to-noise ratio (SIR) of the received control bits of a first number of previous time slots and the calculated average signal-to-noise ratio is compared against the first minimum threshold to determine whether the UE 200 is at the nearly out of synchronisation state. Other techniques for monitoring the radio conditions of downlink communications may alternatively be used using different inputs, such as, RSSI, block error rate, bit error rate, UE speed (since the fading profile can depend on the UE speed).

As discussed above, a mechanism for monitoring when a UE 200 is at an out of synchronisation state is known: the Qin/Qout mechanism. In order to simplify the implementation of the monitoring element 216, in an example of an embodiment of the disclosure, the Qin/Qout mechanism may be adapted and used to monitor the radio conditions to determine when the UE is at the nearly out of synchronisation state with the communications network 102 in addition to monitoring when the UE is at the out of synchronisation state.

Figure 5:
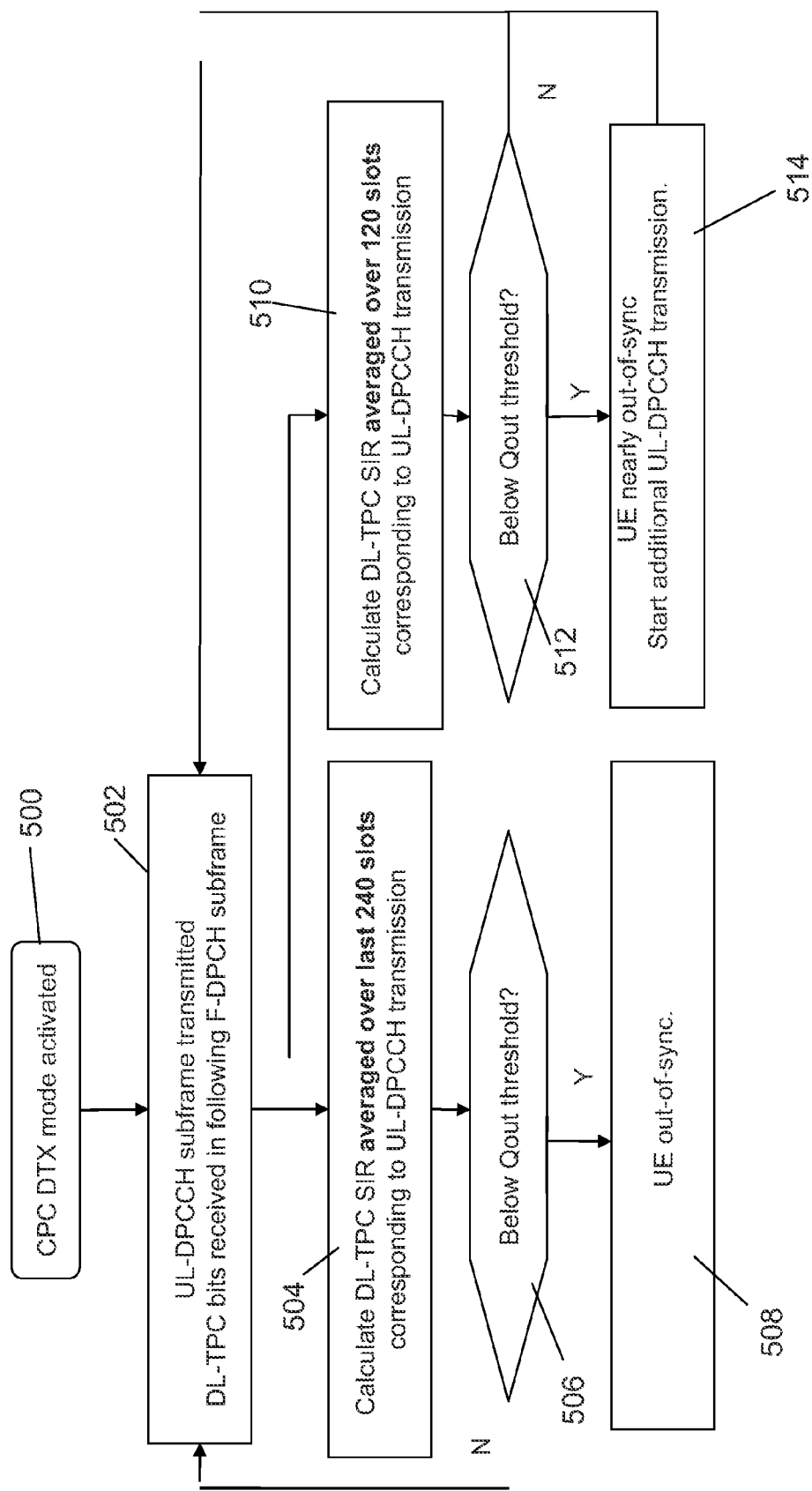
FIG. 5 is a flow diagram showing example steps according to an embodiment of the disclosure for determining when the wireless communications device is at a nearly out of synchronisation state.

Referring now also to FIG. 5 which shows a flow diagram for steps for monitoring when the UE 200 is at a nearly out of synchronisation state according to an example of an embodiment of the disclosure.

At step 500, the UE 200 is operating in the CPC DTX mode. Control information is sent by the UE 200 according to a DTX pattern (for example on a UL-DPCCH subframe) and control bits are received from the communications network 102 in response to the control information (for example TPC bits are received in a following F-DPCH subframe), step 502. The UE 200 determines when the UE is at an out of synchronisation state with the communications network 102 by calculating an average quality of control bits received from the communications network 102 over a second period of time (e.g. the average quality of control bits received from the communications network 102 in a second number of time slots) and when the determined average quality is below a second minimum threshold, determining the UE 200 device is at the out of synchronisation state. In the example of FIG. 5, the UE 200 determines when the UE is at an out of synchronisation state using the Qout threshold. In other words, the second minimum threshold is the Qout threshold which is determined according to the specification identified above. In the example of FIG. 5, the second number of time slots which defines the second period of time is the number of time slots in which control bits are received. The second number of time slots is defined by the 3GPP specification which defines the Qin/Qout mechanism as 240 time slots. The UE 200 (for example, under the control of the processing unit 202) calculates the average of the signal-to-noise ratio (SIR) of the received control bits of the last or previous 240 time slots, step 504. At step 506, the UE 200 (for example, under the control of the processing unit 202) determines whether the calculated average is below the Qout threshold and if the calculated average is below the Qout threshold, the UE 200 determines that it is at the out of synchronisation state (e.g. at a Qout condition), step 508 and in response, the UE 200 shuts off its transmitter and stops completely all uplink transmissions as per the 3GPP specification TS 25.214 V7.17.0 (sections 4.3.1 and 5.1.2.2). If the UE 200 determines that the calculated average is at or above the Qout threshold, then the UE 200 continues to calculate the average quality of control bits received at step 502.

At the same time, the UE 200 is monitoring for the out of synchronisation state, the UE 200 (using the monitoring element 216) monitors the radio conditions of downlink communications by monitoring the control bits received from the communications network 102 at step 502 and determines an average quality of the control bits received from the communications network 102 of the first number of time slots and when the determined average quality is below the first minimum threshold, determining that the UE 200 is at the nearly out of synchronisation state. In one example, the first minimum threshold is substantially the same as the second threshold and the second number of time slots is greater than the first number of time slots (i.e. the second period of time is greater than the first period of time). Alternatively, the first number of time slots may be substantially the same as the second number of time slots and the first minimum threshold is greater than the second minimum threshold.

In the example of FIG. 5, the UE 200 determines when the UE is at a nearly out of synchronisation state using the Qout threshold. In other words, the first minimum threshold is the Qout threshold which is determined according to the specification identified above. In the example of FIG. 5, the first number of time slots which defines the first period of time is the number of time slots in which control bits are received and may be for example, 120 time slots. The UE 200 (for example, under the control of the processing unit 202) calculates the average of the signal-to-noise ratio (SIR) of the received control bits of the last or previous 120 time slots, step 510. At step 512, the UE 200 (for example, under the control of the processing unit 202) determines whether the calculated average is below the Qout threshold and if the calculated average is below the Qout threshold, the UE 200 determines that it is at the nearly out of synchronisation state, step 514 and initiates an transmission of additional control information. The UE 200 then transmits additional control information to the communications network 102 (e.g. on UL-DPCCH), step 502 (and as described above (see for example step 310 of FIG. 3)). In response to the additional control information sent by the UE 200, the communications network 102 sends additional control bits to the UE 200 (e.g. in the following F-DPCH frame), step 502 and the UE 200 calculates the average SIR of the received control bits and additional control bits of the previous 120 time slots, at step 510. If the calculated average is at or above the Qout threshold then no additional control information is sent by the UE 200 and control information is sent according to a DTX pattern or if additional control information has been sent, then the sending of additional control information is stopped (step not shown in FIG. 5).

In an example arrangement where the first and second minimum thresholds are Qout, the second and first number of time slots can be determined empirically with the aim that the first number of time slots will be less than the second number of time slots so as to avoid the out of synchronisation state but the first number of time slots must be large enough to ensure that a proper average of the quality of the radio conditions can be determined (e.g. a proper average of the SIR of the received control bits) so that random spikes are ignored. In other words, the aim is for the UE 200 to react quicker to degrading radio conditions and determine that the UE is at a nearly out of synchronisation state before the UE reaches the out of synchronisation state. Having the first number of time slots of the second number of time slot is a reasonable compromise and the number of time slots can be adjusted based on test results. Thus, with the second number of time slots being 240 time slots, the first number of time slots can be 120 time slots.

By monitoring the radio conditions to the same minimum threshold over a shorter time, the UE in accordance with the invention can detect a nearly out of synchronisation state before reaching an out of synchronisation state and can initiate additional transmissions so as to attempt to avoid reaching an out of synchronisation state (i.e. so as to avoid a Qout condition).

In an alternative arrangement, the first number of time slots may be substantially the same as the second number of time slots and the first minimum threshold is greater than the second minimum threshold. With the second minimum threshold being Qout, the first minimum threshold can be determined empirically. However, an arrangement with the first and second minimum thresholds being Qout is easier to implement.

In summary, the UE in accordance with the disclosure monitors, whilst operating in a CPC DTX mode, the radio conditions of downlink communications using control bits sent by the communications network so as to be able to detect if the UE is close to the out of synchronisation state (e.g. close to the Qout condition). In other words, the UE is at a nearly out of synchronisation state. If the UE determines that it is at a nearly out of synchronisation state (e.g. close to the Qout condition), the UE sends at least one additional control information to the communications network. Thus, the UE in accordance with the disclosure adapts the DTX pattern (e.g. by sending additional control information if needed) based on the quality of the radio conditions of the downlink communications in addition to data activity.

The additional control information (e.g. additional UL-DPCCH control information) are sent in addition to the control information sent according to a DTX pattern and help to increase the downlink and uplink power control rate and limit the risks of the UE reaching the out of synchronisation state. As additional control bits (e.g. addition F-DPCH TPC bits) are sent by the communications network in response to the additional control information sent by the UE, the precision of the out of synchronisation state detection is improved which limits the risks of errors and also the reactivity of the UE to detect the out of synchronisation state is increased which helps in changing radio conditions.

The rate of transmission of the additional control information sent by the UE can be adapted based on the determined quality of the downlink communications. As the UE determines that the quality of the downlink communications is deteriorating and so the UE is getting closer to the out of synchronisation state, the UE can respond by sending additional control information at a higher rate to avoid the out of synchronisation state.

Thus, the UE and method in accordance with the disclosure implements CPC and so maintains the benefit of reduced battery consumption and reduction in unwanted uplink interference provided by CPC whilst reducing the negative impact of CPC on power control and downlink quality estimation.

In the foregoing specification, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different processing systems. For example, the Figures and the discussion thereof describe an exemplary architecture and method which is presented merely to provide a useful reference in discussing various aspects of the disclosure. Of course, the description of the architecture and method has been simplified for purposes of discussion, and it is just one of many different types of appropriate architectures and methods that may be used in accordance with the disclosure. Those skilled in the art will recognize that the boundaries between program elements are merely illustrative and that alternative embodiments may merge elements or impose an alternate decomposition of functionality upon various elements.

The invention claimed is:

1. A method for facilitating synchronization between a communications network and a wireless communications device operating in a Continuous Packet Connectivity, CPC, discontinuous transmission, DTX, mode, the method comprising:
    monitoring at the wireless communications device the radio conditions of downlink communications using control bits received from the communications network;
    determining, based on said monitoring, a first average quality of control bits received in a first number of time slots and a second average quality of control bits received in a second number of time slots, which is greater than the first number of time slots;
    determining the wireless communications device is at a nearly out of synchronization state with the communications network if the first average quality is below a threshold and determining the wireless communications device is at an out of synchronization state with the communications network if the second average quality is below the threshold;
    sending, by the wireless communications device to the communications network, control information on a control channel at a first rate;
    in response to determining the wireless communications device is at a nearly out of synchronization state, sending, by the wireless communications device to the communications network, control information on the control channel at a second rate that is greater than the first rate, sending the control information at the second rate to include sending additional control information with at least some of the additional control information associated with empty logical link control (LLC) frames; and
    receiving, at the wireless communications device, additional control bits sent by the communications network in response to the communications network receiving the additional control information sent by the wireless communications device.

2. The method of claim 1, further comprising:
    sending control information by the wireless communications device according to a DTX pattern.

3. The method of claim 1, wherein monitoring includes monitoring the radio conditions using the control bits received according to a DTX pattern and the additional control information.

4. The method of claim 1, further comprising sending the control information at the second rate until the wireless communications device determines that the wireless communications device is not at a nearly out of synchronization state.

5. The method of claim 4, wherein additional control information is sent periodically.

6. The method of claim 4, further comprising:
    varying the second rate based upon the monitored radio conditions of downlink communications.

7. A wireless communications device operating in a Continuous Packet Connectivity, CPC, discontinuous transmission, DTX, mode, with a communications network, the wireless communications device comprising:
    a receiver to receive downlink communications from the communications network;
    a monitoring element to monitor the radio conditions of downlink communications using control bits received from the communications network; determine, based on the monitored radio conditions, a first average quality of control bits received in a first number of time slots and a second average quality of control bits received in a second number of time slots, which is greater than the first number of time slots: and determine the wireless communications device is at a nearly out of synchronization state with the communications network if the first average quality is below a threshold and determining the wireless communications device is at an out of synchronization state with the communications network if the second average quality is below the threshold;
    a transmitter to send to the communications network, control information on a control channel at a first rate and, in response to determination that the wireless communications device is at a nearly out of synchronization state, send control information on the control channel at a second rate that is greater than the first rate, the control information sent at the second rate to include additional control information with at least some of the additional control information associated with empty logical link control (LLC) frames; and
    wherein the receiver is to receive additional control bits sent by the communications network in response to the communications network receiving the additional control information sent by the wireless communications device.

8. The wireless communications device of claim 7, wherein the transmitter is to send control information according to a DTX pattern.

9. The wireless communications device of claim 7, wherein the monitoring element is to monitor the radio conditions by using the control bits received according to a DTX pattern and the additional control information.

10. The wireless communication device of claim 7, wherein the control bits are Transmit Power Control, TPC, bits.

11. The wireless communication device of claim 7, wherein the control channel is an UpLink Dedicated Physical Control CHannel, UL-DPCCH.

12. The wireless communication device of claim 7, wherein the additional control message is associated with an empty frame with no data sent on a data channel.

13. The wireless communication device of claim 7, wherein the first number of time slots is 120 time slots and the second number of time slots is 240 time slots.

14. The method of claim 1, wherein the first number of time slots is 120 time slots and the second number of time slots is 240 time slots.

* * * * *